April 5, 1938.  E. BUGATTI  2,113,315
INTERNAL COMBUSTION ENGINE
Filed July 26, 1935   2 Sheets-Sheet 1
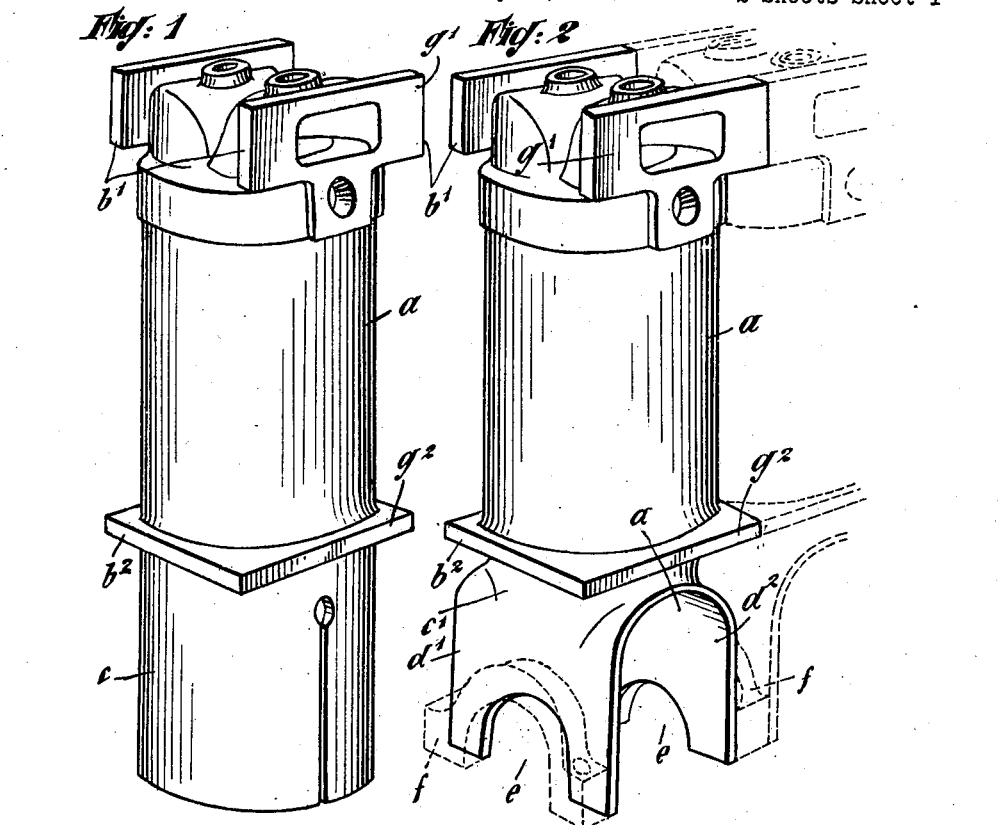
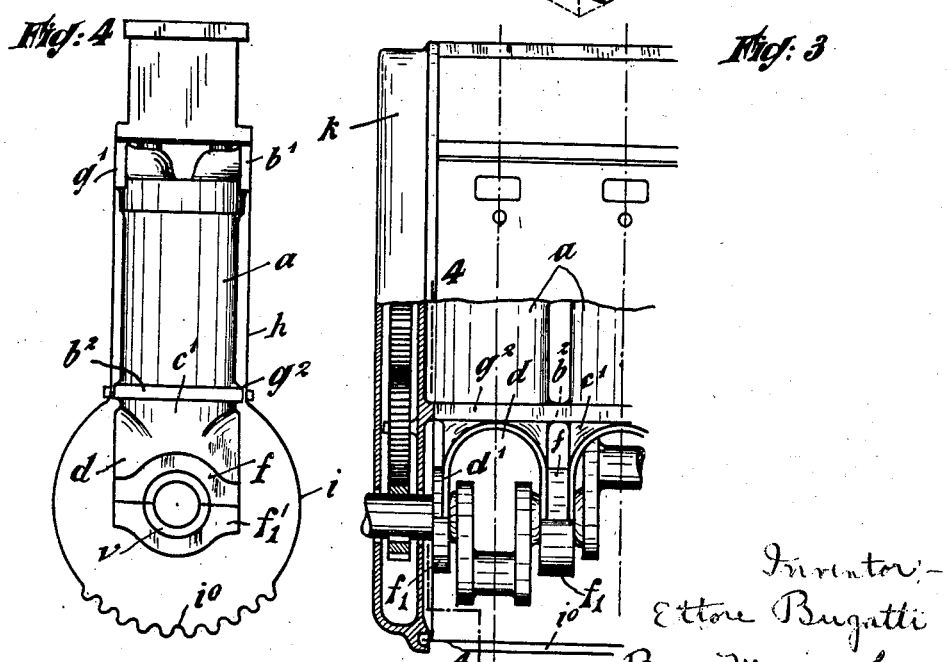
Inventor:-
Ettore Bugatti
By Mauro + Lewis
Attorneys April 5, 1938. E. BUGATTI 2,113,315
INTERNAL COMBUSTION ENGINE
Filed July 26, 1935 2 Sheets-Sheet 2
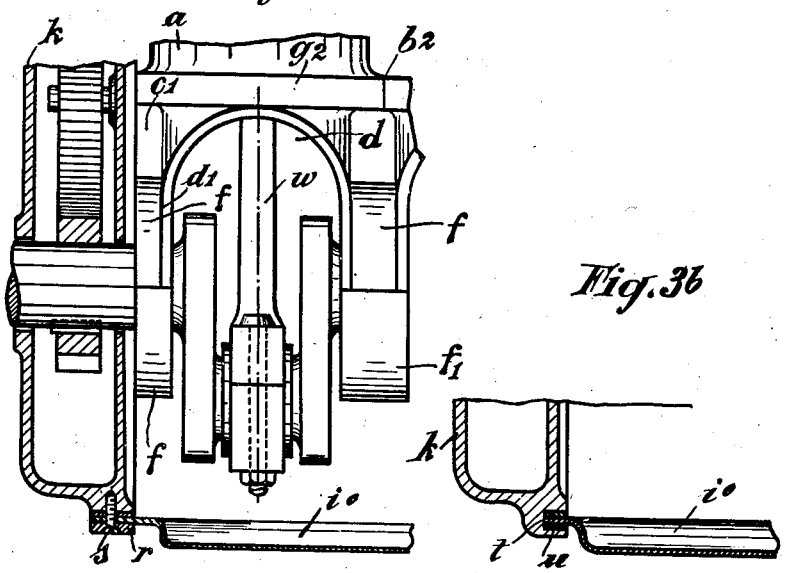
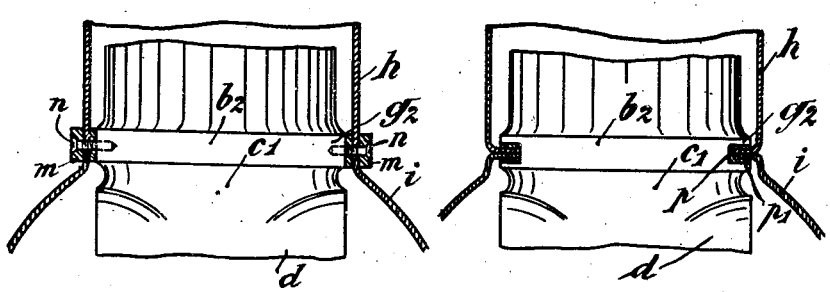
Inventor:-
Ettore Bugatti
By Mauro + Lewis
Attorneys Patented Apr. 5, 1938

2,113,315

UNITED STATES PATENT OFFICE 2,113,315

INTERNAL COMBUSTION ENGINE

Ettore Bugatti, Molsheim, France

Application July 26, 1935, Serial No. 33,405
In France August 2, 1934

8 Claims. (Cl. 121—194)

The present invention relates to motors and especially internal combustion engines.

The object of the invention is to provide an engine which is both of lighter weight and more rigid than the engines made up to the present time.

According to the essential feature of the invention, steel cylinders are machined individually from a forged block so as to be provided, on the one hand, with flat vertical surfaces along which they can be assembled together by welding, and, on the other hand, with an arch-shaped lower portion so as to afford passage for the big ends of the connecting rods, the lateral flat faces of this lower portion being adapted to be welded with intermediate pieces forming supports for the bearings. After the parts have been assembled, the whole forms a rigid block.

Other features of the present invention will result from the following detailed description of a specific embodiment thereof.

A preferred embodiment of the present invention will be hereinafter described, with reference to the accompanying drawings, given merely by way of example, and in which:

Fig. 1 is a perspective view of a cylinder to be used in connection with the present invention, prior to the machining of the lower portion thereof;

Fig. 2 is a view similar to Fig. 1, after the machining thereof has been completed;

Fig. 3 is a diagrammatic front view, partly in section, of the engine;

Fig. 3a is a view, similar to Fig. 3, showing a detail modification;

Fig. 3b is a detail view on an enlarged scale corresponding to Fig. 3;

Fig. 4 is a diagrammatic sectional view on the line 4—4 of Fig. 3.

Fig. 4a is a detail view on an enlarged scale of a portion of the structure disclosed by Fig. 4;

Fig. 4b is a view, similar to Fig. 4a, corresponding to a modification.

As shown by the drawings, each of the cylinders $a$, machined individually from a forged block, is provided, at the bottom and the top, with plane wall elements or surfaces $b^1$, $b^2$, intended to be assembled, by electric welding, against the corresponding plane surfaces of the adjacent cylinder, as shown in dotted lines in Fig. 2. The lower part $c$, of tubular shape (Fig. 1), of the cylinder is then shaped by dieing in the hot state, as shown in Fig. 2. As shown by the drawings, the finished lower portion $c^1$ of the cylinder is given the shape of an arch leaving a passage for the big end of the connecting rod $w$. The lateral flat faces $d^1$, $d^2$ of this portion of the cylinder, cut away at $e$, are then welded to intermediate pieces or bridges $f$ forming, in cooperation with elements $f^1$, supports for the bearings $v$ of the crankshaft. Each piece $f$ is assembled by welding with the two adjacent cylinders.

The lateral faces of the cylinder are further provided with plane surfaces $g^1$, $g^2$ which, eventually, after a final surfacing, may be provided a sheet metal envelope $h$ forming a water jacket.

The whole constitutes a block or unit which is extremely rigid and of light weight, supporting all the chief organs of the engine, such as: camshaft, valves, pistons, connecting rods, crankshaft, etc.

The crankcase of the engine is reduced to a mere envelope $i$, of sheet iron, which serves only to collect oil projected from the bearings and connecting rods and to protect these pieces against dust, water, etc.

This envelope $i$ is fixed against the lower flange or flat surface $g^2$ of the cylinders in any suitable manner, for instance by means of a small flat rod $m$ and screws $n$, (Fig. 4a). Also, as shown by Fig. 4b, this flange or flat surface $g^2$ may be provided with a groove $p$ in which is engaged, eventually with the interposition of a joint $p^1$, the upper edge of the sheet metal envelope $i$.

At both ends of the cylinder block (Fig. 3) shall be fixed pieces $k$ which will constitute the end parts of the crankcase. The assembly between these end parts $k$ and the envelope, the bottom of which is shown at $i^0$ in Figs. 3, 3a and 3b, shall be made in the same manner as the fixation of the envelope to the block of cylinders, that is to say either by means of a small flat rod $r$ and screws $s$, (Fig. 3a) or by the insertion of the edge of the metal sheet $i^0$ into a groove $t$ provided with a joint $u$, (Fig. 3b). This shall also avoid the effect of the difference of expansion between the block and the metal sheet.

The two end parts $k$, which may consist of castings, of a light alloy for instance, may constitute casings intended to contain the distribution gears, the control parts and organs of the oil pumps, water pumps, superchargers, fans, etc.

The bottom $i^0$ of the sheet metal casing $i$ may be given a corrugated shape so as to increase its rigidity and facilitate its cooling. The lateral faces of said casing may be provided with inspection covers through which the connecting rods and bearings can be reached.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an engine having connecting rods and bearings, the combination of a plurality of cylinders each provided with flat surfaces assembled by welding with the corresponding flat surfaces of at least one adjacent cylinder, respectively, the lower portion of each cylinder being arch-shaped so as to leave passage for the corresponding connecting rod, said arch-shaped portions having flat lateral outer surfaces, and intermediate pieces fixed by welding to the last mentioned flat surfaces between two consecutive cylinders respectively, said last mentioned pieces being adapted to support said bearings, respectively.

2. In an engine having an envelope, rods and bearings, the combination of a plurality of cylinders, each provided with flat surfaces assembled by welding with the corresponding flat surfaces of at least one adjacent cylinder respectively so as to form a line of interconnected cylinders, the lower portion of each cylinder being arch-shaped so as to leave passage for the corresponding connecting rod, said arch shaped portion having lateral outer surfaces, said cylinders further carrying on their outer walls flat lateral surfaces parallel to the line of cylinders for fixing said envelope thereto, and intermediate pieces secured by welding to the flat lateral surfaces on the arch-shaped portions, said intermediate pieces being adapted to support said bearings respectively.

3. In an engine having an envelope, rods and bearings, the combination of a plurality of cylinders, each provided with flat surfaces assembled by welding with the corresponding flat surfaces of at least one adjacent cylinder respectively so as to form a line of interconnected cylinders, the lower portion of each cylinder being arch-shaped so as to leave passage for the corresponding connecting rod, said arch shaped portion having lateral outer surfaces, said cylinders further carrying on their outer walls flat lateral surfaces parallel to the line of cylinders, adapted partly for fixing said envelope thereto; intermediate pieces secured by welding to the flat lateral surfaces on the arch-shaped portions, said intermediate pieces being adapted to support said bearings respectively; and a crankcase envelope secured to said flat lateral surfaces on the outer walls of the cylinders.

4. In an engine having an envelope, rods and bearings, the combination of a plurality of cylinders, each provided with flat surfaces assembled by welding with the corresponding flat surfaces of at least one adjacent cylinder respectively so as to form a line of interconnected cylinders, the lower portion of each cylinder being arch-shaped so as to leave passage for the corresponding connecting rod, said arch shaped portion having lateral outer surfaces, said cylinders further carrying on their outer walls flat lateral surfaces parallel to the line of cylinders, adapted partly for fixing said envelope thereto, intermediate pieces secured by welding to the flat lateral surfaces on the arch-shaped portions, said intermediate pieces being adapted to support said bearings respectively, and end pieces for the crankcase envelope, the end pieces consisting of casings for parts of the engine.

5. An engine cylinder which comprises, in combination, a body portion, upwardly projecting lugs having flat lateral surfaces integral with said body portion at the top part thereof, a radially projecting flange having flat lateral surfaces integral with said body portion at the lower part thereof, and a downwardly projecting arch-shaped extension integral with the lower end of said body portion.

6. A multi-cylinder engine which comprises, in combination, a crank shaft, a plurality of juxtaposed cylinders each having, integral therewith, an arch-shaped extension depending therefrom, means for securing the extension of each cylinder to the corresponding extensions of the adjacent cylinders, and means for suspending the crankshaft of said multi-cylinder engine from said cylinder extensions.

7. In a multi-cylinder engine having a plurality of laterally juxtaposed cylinders secured to one another and forming a unitary cylinder block, the combination of a plurality of arch-shaped extensions each integral with and depending from one of the cylinders, with intermediate spacer and bearing supports each adapted to span the interval between adjacent extensions and secured to the same.

8. In a multi-cylinder engine having a plurality of laterally juxtaposed cylinders secured to one another and forming a unitary cylinder block, a crankshaft, and bearings for said crankshaft, the combination of a plurality of arch-shaped extensions each integral with and depending from one of the cylinders, intermediate spacer and bearing supports each adapted to span the interval between adjacent extensions and secured to the same, said extensions and said spacer and bearing supports having corresponding recessed portions for accommodating said bearings, and means for holding said bearings directly in said recessed portions.

ETTORE BUGATTI.